United States Patent
Riedel et al.

(10) Patent No.: US 8,264,801 B2
(45) Date of Patent: Sep. 11, 2012

(54) ARRANGEMENT AND APPROACH FOR COUPLING POWER SUPPLIES USING CONTROLLED SWITCHING TECHNIQUES

(75) Inventors: Friedbert Riedel, Zug (CH); Giovanni Genna, Zurich (CH)

(73) Assignee: NXP B.V., Eindhoven (NL)

( * ) Notice: Subject to any disclaimer, the term of this patent is extended or adjusted under 35 U.S.C. 154(b) by 197 days.

(21) Appl. No.: 12/745,275

(22) PCT Filed: Nov. 27, 2008

(86) PCT No.: PCT/IB2008/054977
§ 371 (c)(1),
(2), (4) Date: May 28, 2010

(87) PCT Pub. No.: WO2009/069092
PCT Pub. Date: Jun. 4, 2009

(65) Prior Publication Data
US 2010/0301673 A1    Dec. 2, 2010

Related U.S. Application Data

(60) Provisional application No. 60/991,386, filed on Nov. 30, 2007.

(51) Int. Cl.
*H02J 7/00* (2006.01)

(52) U.S. Cl. .......................................... 361/18; 307/66

(58) Field of Classification Search ............ 361/18; 307/66
See application file for complete search history.

(56) References Cited

U.S. PATENT DOCUMENTS

| | | | |
|---|---|---|---|
| 5,306,961 A * | 4/1994 | Leo | 327/530 |
| 5,341,034 A * | 8/1994 | Matthews | 327/534 |
| 6,147,517 A * | 11/2000 | AlNahas et al. | 327/65 |
| 6,285,091 B1 | 9/2001 | Chan et al. | |
| 7,446,434 B1 * | 11/2008 | Simmons et al. | 307/75 |
| 7,834,481 B2 * | 11/2010 | Anderson et al. | 307/85 |
| 2004/0160330 A1 | 8/2004 | McClure et al. | |
| 2004/0217653 A1 | 11/2004 | Neidorff | |
| 2005/0275977 A1 | 12/2005 | Joshi et al. | |
| 2006/0212137 A1 | 9/2006 | Sone | |

FOREIGN PATENT DOCUMENTS
WO    2008/070381 A2    6/2008

OTHER PUBLICATIONS

International Search Report and Written Opinion for Int'l. Patent Appln. No. PCT/IB2008/054977 (Jun. 15, 2009).

* cited by examiner

*Primary Examiner* — Danny Nguyen (57) ABSTRACT

Power supplies are switched in a manner that mitigates parasitic shorts. According to an example, a control circuit (e.g., 310) operates primary and backup power supplies using the higher of the primary and backup supply voltages, for switching between the power supplies.

16 Claims, 6 Drawing Sheets

ARRANGEMENT AND APPROACH FOR COUPLING POWER SUPPLIES USING CONTROLLED SWITCHING TECHNIQUES

The present invention relates generally to providing power to a circuit by switching between a first power supply and a second power supply and more particularly to switch controlling techniques.

Integrated circuits often have a main power supply (often referred to as $V_{CC}$) and a backup power supply. Backup supplies allow the circuit to continue to function when the main power supply is interrupted or drops below a preset voltage level for some reason. A switchover circuit is used to switch the internal power (often referred to as $V_{dd}$) of the circuit between the main supply and the backup supply. It is desirable to have a switchover circuit that uses internal power ($V_{dd}$) as its supply voltage and that uses a low amount of power. As circuits continue to decrease in size, it is also desirable that switchover circuits occupy a small area.

One type of switchover circuit uses separate switches to switch main and backup supplies on and off as a function of the voltage level of the supplies. This switching between supplies can be difficult to carry out in a rapid and efficient manner. For instance, as a main power supply is ramping down in power and power is to be switched to a backup supply, a connection to the main power supply can still be on as a connection to the backup supply is starting to come on. In this case, there is a parasitic short between both power supplies.

One type of a backup power supply for integrated circuits that is susceptible to such shorting is a battery backup power supply. With battery backups, switchover circuits that use a relatively low amount of power are useful for extending battery life. For example, switchover circuits in which the power from the net is used together with a backup supply is useful in electronic devices such as clock radios, electronic metering devices and others.

An example type of switchover circuit that employs a battery backup power supply uses comparators to compare a main power supply voltage ($V_{CC}$) to a backup battery voltage ($V_{BAT}$) and to a battery threshold value ($V_{BMT}$). The comparators are powered with internal power ($V_{dd}$), and the battery threshold value ($V_{BMT}$) is generated by a reference circuit that is also powered with internal power ($V_{dd}$). The switchover circuit switches to the backup battery when the voltage of the main supply ($V_{CC}$) is less than both the battery voltage ($V_{BAT}$) and the battery threshold value ($V_{BMT}$), and switches back to the main power supply when the main supply voltage is greater than the battery voltage or the battery threshold value. While such an application can be useful, there are certain undesirable characteristics. For example, this approach to switchover is also susceptible to parasitic shorting as described above. In addition, the battery threshold value ($V_{BMT}$) generally has to be specified at a value lower than the minimum voltage of the internal power ($V_{dd}$) because the battery threshold value is generated by a reference circuit that is powered with internal power.

Certain switchover approaches have powered comparators and a reference circuit that generates a battery threshold value ($V_{BMT}$) with a voltage level higher than the internal power ($V_{dd}$). The higher voltage level can be generated by using a doubler to increase the voltage level of the internal power ($V_{dd}$). However, the addition of a doubler can increase the size and the power consumption of the switchover circuit.

Other switchover circuit approaches compare partitioned levels of the inputs (e.g., $V_{CC}/2$, $V_{BAT}/2$ and $V_{BMT}/2$). However, the generation of partitioned voltage levels, using circuits such as a bandgap source and a resister divider, can result in an increase in the power consumption and in the size of the switchover circuit.

These and other issues have presented challenges to the implementation of switchover circuits.

Various aspects of the present invention are directed to arrangements for and methods of switching between a first power supply and a second power supply in a manner that addresses and overcomes the above-mentioned issues and other issues as directly and indirectly addressed in the detailed description that follows.

According to an example embodiment of the present invention, an arrangement selectively couples one of a primary power supply and a backup power supply to an output for operating a circuit. The arrangement includes a primary switch to couple the primary power supply to the output, a backup switch to couple the backup power supply to the output, and a controller circuit to control the operation of the switches. The controller circuit controls the switches to selectively couple the primary and backup supplies to the output as a function of a voltage level of the primary and backup power supplies and a predetermined threshold voltage. The controller circuit includes a levelshifter circuit and a high voltage supply circuit. The level shifter circuit supplies a voltage input to the primary and backup switches for controlling the switches in on and off states. The high voltage supply circuit selectively supplies a high voltage input, using the higher of the primary and backup power supply voltages, to the level shifter circuit to facilitate the control of the primary and backup switches and mitigate parasitic shorting between the power supplies.

According to another example embodiment of the present invention, a switch controller arrangement controls power supply switches for selectively connecting primary and backup power supplies to an output node. The switch controller includes a levelshifter circuit that supplies a control voltage to each of the power supply switches for independently controlling the switches in on and off states in response to a high voltage input at a high voltage input node. The switch controller also includes a high voltage supply circuit connected to the high voltage input node to selectively couple a high voltage to the level shifter circuit for use in supplying said control voltage. The high voltage is coupled using the backup power supply voltage under operating conditions in which the primary power supply voltage is lower than the backup power supply voltage, and using the primary power supply voltage under conditions in which the primary power supply voltage is higher than the backup power supply voltage.

The above summary of the present invention is not intended to describe each embodiment or every implementation of the present invention. Other aspects of the invention will become apparent and appreciated by referring to the following detailed description and claims taken in conjunction with the accompanying drawings.

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

The present invention is believed to be applicable to a variety of arrangements and approaches for switching between a first and a second power supply. While the present invention is not necessarily limited to such applications, an appreciation of various aspects of the invention is best gained through a discussion of examples in such an environment.

According to an example embodiment of the present invention, a power switch circuit automatically switches power sources using a control approach to mitigate or eliminate shorting between power supplies. For example, when implemented with CMOS-based switches that are susceptible to shorting (e.g., when both power sources are momentarily connected as power is switched between the two), control logic and related circuitry is implemented to operate the switches in a manner that reduces or eliminates the shorting.

In a more particular example embodiment of the present invention, a backup power switchover circuit monitors a primary power supply level and automatically switches to a backup power source, such as a battery power source, in response to the primary power supply level reaching or falling below a threshold. The threshold is set to suit the particular circuit application, and may involve a comparison between the backup power source level and the primary power supply level. A controller operates power supply switches in a manner that mitigates or eliminates parasitic shorting or short circuiting. For instance, the switches can be selectively operated using either of the primary or backup power supplies to maintain control of the switches as the primary power supply is ramping down (for switching from primary to backup power) or as the primary power supply is ramping up (for switching from backup to primary power).

In one application, CMOS switches are used to selectively couple power sources to circuit components, with each switch operated to couple or decouple a single power source from the circuit components. Control logic operates the switches to mitigate parasitic shorts that can occur at a point during switching, such as where one CMOS switch is closed to a primary power source, or starting to open to the primary power source, and another CMOS switch is starting to close or closed to a backup power source. For example, by controlling the gate of transistors, which are used to switch power supplies on and off, in a manner that ensures that the voltage level at the transistors is high enough to control the transistor in an "off" condition until an appropriate switching time, parasitic leakage that can otherwise occur as the power supply levels fluctuates.

In the above examples, switching from a backup power source to a primary power source is similarly carried out (e.g., when the primary power supply level reaches or exceeds a threshold), to mitigate or eliminate parasitic shorting or short circuiting. Such approaches are applicable, for example, to use with portable devices operable via an internal battery or an external power source.

Figure 1A:
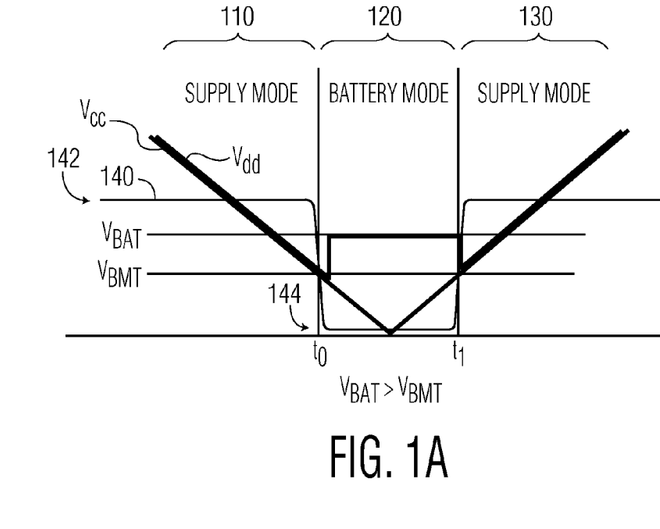
FIGS. 1A and 1B show plots of example operating characteristics of a power arrangement, according to example embodiments of the present invention.
Figure 1B:
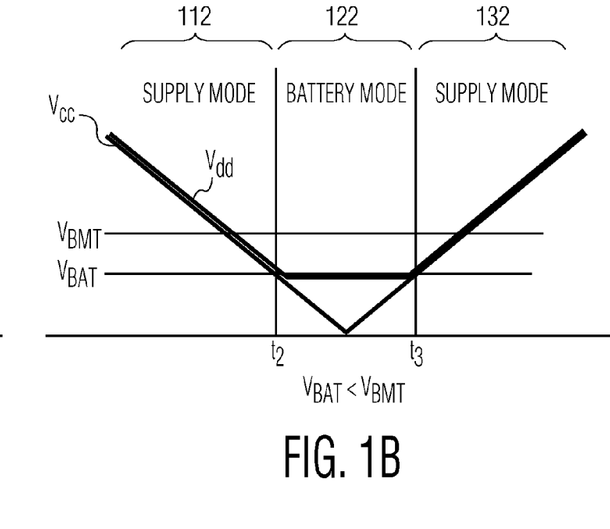

FIGS. 1A and 1B show plots of example operating characteristics of a power supply arrangement involving a primary power source and a backup battery power source, according to example embodiments of the present invention. Two operational modes are shown as the "supply" mode and "battery" mode, in which power is supplied respectively from a primary power supply and a battery power supply. Terms shown in the figures are as follows:

$V_{cc}$=main power supply voltage
$V_{dd}$=power supplied to operable circuits
$V_{BAT}$=battery voltage
$V_{BMT}$=battery mode threshold voltage In FIG. 1A and when in a supply mode 110 at the leftmost portion of the plot, circuits are operated using a primary power supply, with $V_{cc}$ providing $V_{dd}$. As $V_{cc}$ drops moving left to right (i.e., over time along the horizontal axis), it is shown by way of example as falling below the voltage level of $V_{BAT}$ and, subsequently, $V_{BMT}$. Upon reaching and/or falling below $V_{BMT}$ at time $t_0$, the power supply arrangement enters the battery mode as indicated on the plot, and the power supply is switched from the main power supply ($V_{cc}$) to the battery supply ($V_{BAT}$), and from the first supply mode to the battery mode 120. The switching is controlled to selectively use the primary or backup voltage levels ($V_{cc}$ or $V_{BAT}$) to mitigate or eliminate any parasitic shorting or short-circuiting. In short, the voltage level at the switches is controlled to ensure that transistors closing to the backup supply have about the same value as the backup voltage (like it's source) so that the gate-source voltage is (about) 0V, or is slightly negative. This is useful, for example, where switching is effected as or after the primary power supply has dropped below the voltage level of the backup power supply prior to switching to backup power.

Upon switching to the backup battery supply, the circuit is operated in the battery mode 120, with $V_{BAT}$ providing $V_{dd}$, as long as $V_{cc}$ is at and/or below $V_{BMT}$. When $V_{cc}$ reaches or surpasses $V_{BMT}$ at time $t_1$, the power supply is switched back to a (second) supply mode 130 with the primary power supply ($V_{cc}$) again providing $V_{dd}$.

FIG. 1B shows another approach to switching power supplies, where $V_{BAT}$ is less than $V_{BMT}$, in connection with another example embodiment. In this instance, power is not switched over when $V_{BMT}$ is reached but instead after the power supply voltage, $V_{cc}$, drops below $V_{BMT}$ and further reaches or falls below $V_{BAT}$. This application may be implemented in a manner that is consistent with the approach shown in FIG. 1A, such as where the battery voltage, $V_{BAT}$, may vary in accordance with the battery's power or other conditions. A similar approach applies, for example, where $V_{BAT}$ is about equal to $V_{BMT}$.

Continuing to refer to FIG. 1B, power is switched from a supply mode 110 or 112 to a battery mode 120 or 122 at time $t_2$ when $V_{cc}$ is equal to or less than $V_{BMT}$, and further when $V_{cc}$ is also equal to or less than $V_{BAT}$. This approach addresses situations where the battery voltage $V_{BAT}$ is less than the threshold voltage $V_{BMT}$ (e.g., when the battery is not fully charged or otherwise operating under conditions with $V_{BAT}$ being less than $V_{BMT}$), relative to those as shown in FIG. 1A. Switching is again effected in a manner similar to that described in connection with FIG. 1A, with switch control using a high voltage (e.g., from the higher of the primary and backup power supplies) to ensure proper switch operation.

When the system is operating in the battery mode 122 and $V_{cc}$ climbs back to the level of $V_{BAT}$ or higher at time $t_3$, the power supply is switched back to a (second) supply mode 132 and to the main power supply ($V_{cc}$). As with the approach in FIG. 1A, switching is effected in a manner to mitigate or eliminate parasitic shorting or short circuiting.

In both FIG. 1A and FIG. 1B, the voltage levels and application of the same vary depending upon the circuit, operating conditions and desired control approach. For instance, these approaches are applicable to implementation with power supplies that vary differently than that shown by way of $V_{cc}$ and/or $V_{BAT}$. One such example plot 140 is shown in FIG. 1A as an alternate pattern for the supply $V_{cc}$, with the voltage level dropping from an "on" state and voltage level 142 to about zero in an "off" state and voltage level 144 at time $t_0$, and returning back to the "on" level at time $t_1$.

Figure 2:
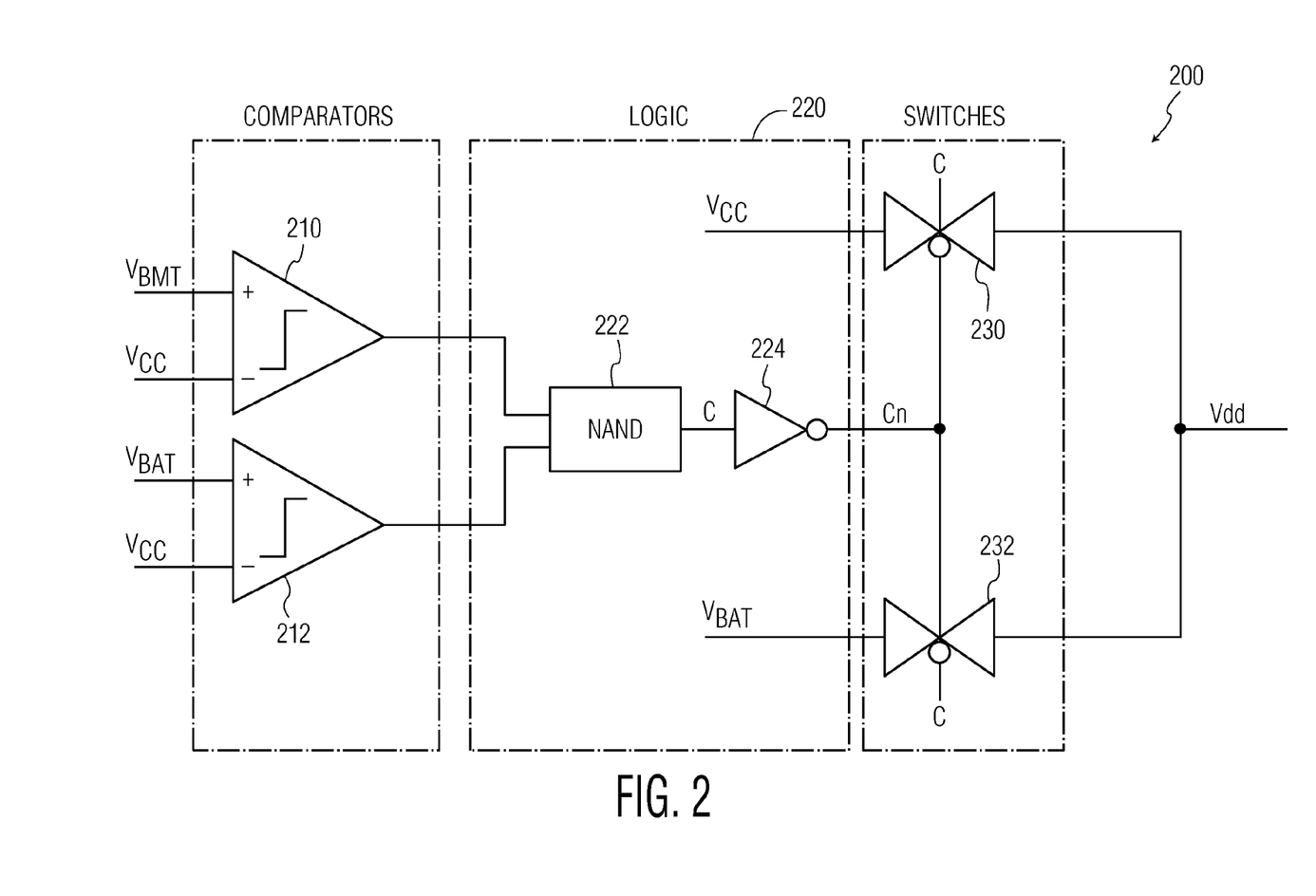
FIG. 2 shows a block diagram for a power circuit, according to another example embodiment of the present invention.

FIG. 2 shows a block diagram for a power circuit 200 implementing a backup power source, according to another example embodiment of the present invention. The power circuit 200 may be operated in accordance with the approaches described above in connection with FIGS. 1A and 1B, and are described using similar terminology by way of example. The power circuit 200 is operated using comparators 210 and 212 that respectively compare $V_{BMT}$ to $V_{CC}$, and $V_{BAT}$ to $V_{CC}$, to respectively determine whether a primary power source is below a threshold level and whether the primary power source is below a battery power level. A control logic circuit 220 includes an NAND device 222 and an inverter 224, and provides a control output to power switches 230 and 232 for respectively coupling primary and backup power sources ($V_{CC}$ and $V_{BAT}$) to supply main power ($V_{DD}$) to a circuit. The control logic circuit 220 controls the switches 230 and 232 in a manner that mitigates or eliminates parasitic shorting or short-circuiting as described, for example, above in connection with ensuring that the backup switch 232 is controlled so that its gate-source voltage is (about) 0V, or is slightly negative.

Figure 3:
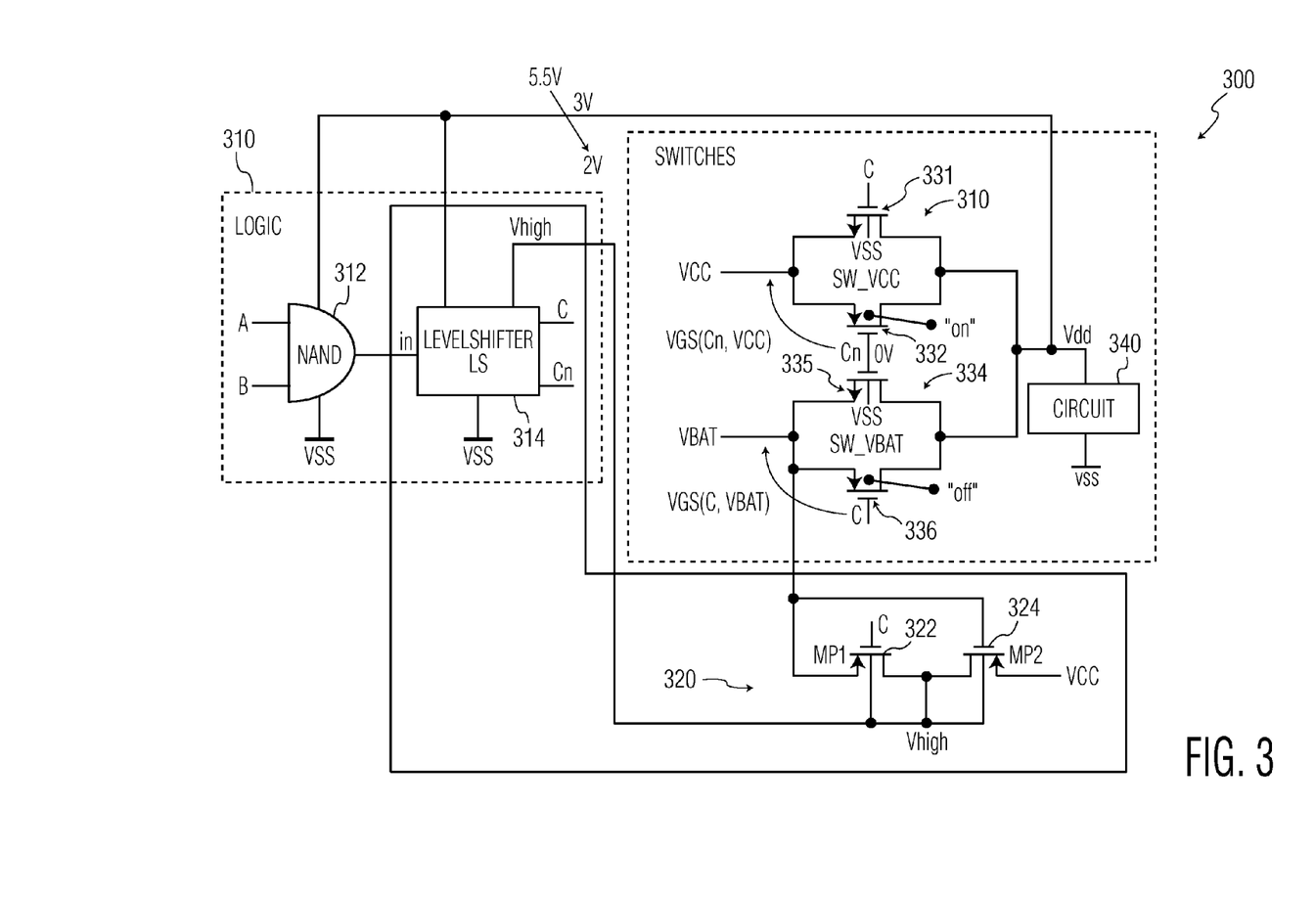
FIG. 3 shows a power switch control circuit, according to another example embodiment of the present invention.

FIG. 3 shows a power switch control circuit 300 for providing a power output ($V_{dd}$) to a circuit 340, according to another example embodiment of the present invention. The switch control circuit 300 includes control logic 310 and a switch voltage supply circuit 320 that control primary power switch 330 and backup power switch 334, to respectively supply primary or backup power ($V_{dd}$) to circuit 340. The primary power switch 330 includes an NMOS transistor 331 and a PMOS transistor 332. Similarly, the backup power switch 334 includes an NMOS transistor 335 and a PMOS transistor 335.

The control logic 310 includes a NAND gate 312 (e.g., fed via A and B by comparators as shown in FIG. 2) that controls a levelshifter 314, which receives the output ($V_{dd}$) and a high voltage $V_{high}$ that is generated by the switch voltage supply circuit 320 and also present at the PMOS substrate of the primary and backup switches 330 and 334. The switch voltage supply circuit 320 includes a series construction of two PMOS transistors, 322 and 324, between the backup and primary power supplies (between $V_{BAT}$ and $V_{CC}$). The levelshifter 314 generates outputs "C" and "Cn," with output "C" provided to transistors 331 and 336, and output "Cn" provided to transistors 332 and 335. The output "C" from the levelshifter 314 is also provided at the gate of transistor 322 in the voltage supply circuit 320.

When the primary power supply is ramping down, such as shown in the first supply mode as shown in either of FIG. 1A or FIG. 1B, the controlling voltage (($V_{GS}$(C, $V_{BAT}$)=C−$V_{BAT}$) of the backup power switch 334 has a value of the supply $V_{dd}$=$V_{CC}$=3V, thus keeping the switch in the "off" condition. The voltage supply circuit 320 and levelshifter 314 thus facilitate the application of a voltage "C" to the backup power switch 334 at transistor 336 to mitigate or eliminate parasitic shorting between power sources ($V_{CC}$ and $V_{BAT}$) respectively coupled to the switches 330 and 334. That is, $V_{GS}$ for the PMOS transistor 336 of the backup power switch 334 is controlled to be greater than the threshold voltage ($V_{thp}$) of the PMOS transistor 336.

When operating in a battery mode, such as that shown in either of FIG. 1A or FIG. 1B, and the primary power supply ramps back up, the voltage supply circuit 320 and levelshifter 314 control the switching to the primary power supply in a similar manner. The inputs as supplied from the levelshifter 314 to the primary power switch 330 are controlled using the $V_{high}$ input to the levelshifter as provided by the voltage supply circuit 320. This maintains the primary power switch 330 in the "off" state long enough to mitigate parasitic shorting as the backup power switch 334 is going from an "on" state to an "off" state.

In either switching from primary to backup power supplies or vice-versa, the output "C" in FIG. 3 is thus controlled, relative to the voltage at the respective power supplies, to maintain the respective switches 330 and 334 in the "off" state during switching to mitigate parasitic shorting. This is useful, for example, relative to supplying the output "C" from $V_{dd}$ (as provided via an active power supply, be it the primary or backup power), which can result in a negative $V_{GS}$ at the respective PMOS transistors 331 and 336.

Figure 4:
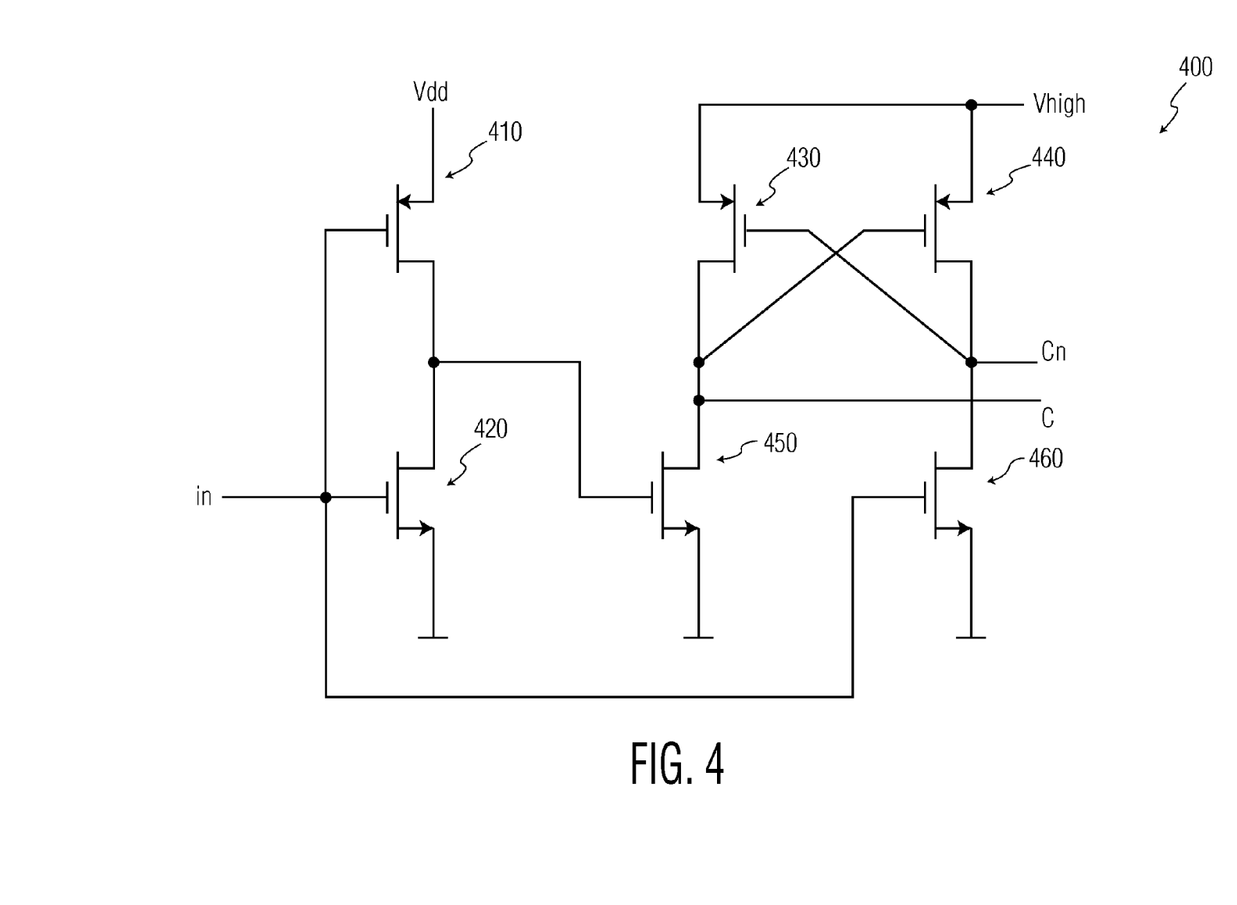
FIG. 4 shows a level shifter circuit using supply voltage provided by a power switch control circuit, according to another example embodiment of the present invention.

FIG. 4 shows a levelshifter circuit 400 using supply voltage provided by a power switch control circuit, according to another example embodiment of the present invention. The levelshifter circuit 400 may, for example, be implemented in connection with the power switch control circuit 300 as levelshifter 314 as shown in FIG. 3. The levelshifter circuit 400 includes six transistors 410-460, with $V_{dd}$ coupled at transistor 410 and a high voltage $V_{high}$ (e.g., from a switch voltage supply circuit 320 as shown in FIG. 3) coupled at transistors 430 and 440. The input to the levelshifter circuit 400 is coupled at the gates of transistors 410 and 420. The output C is coupled to transistors 440 (gate), 430 and 450, and the output $C_n$ is coupled to transistors 430 (gate), 440 and 460. The outputs C and $C_n$ are further coupled, for example, to power supply switches as shown in FIG. 3.

The circuit shown in FIG. 4 and/or its function may be implemented in connection with a variety of circuits, such as those described above. One type of monitoring circuit with which various embodiments of the present invention may be implemented is shown in (PCT Application No. PCT/US2007/83715) to F. Riedel and G. Genna, entitled "Arrangement and method for providing power to a circuit using switched capacitor techniques," filed on Nov. 7, 2007 and fully incorporated herein by reference.

Figure 5:
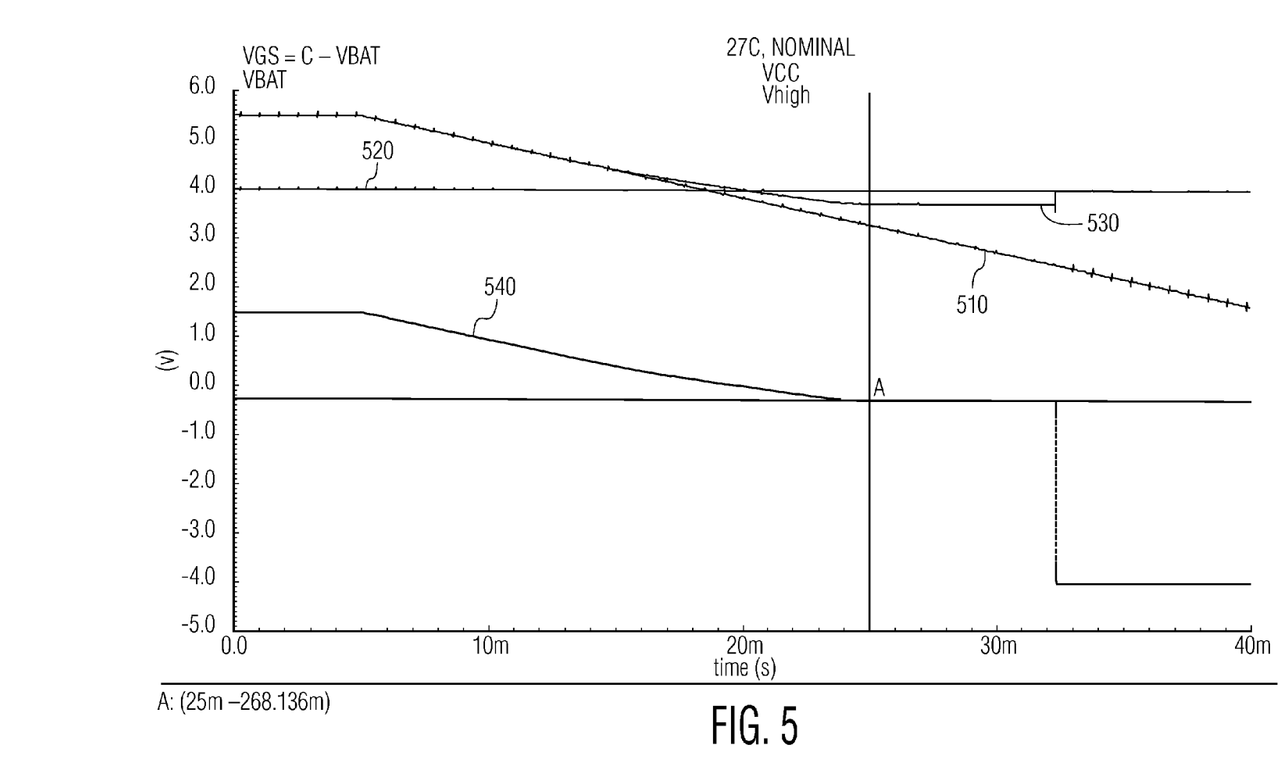
FIG. 5 shows plots of voltage over time for an approach to power control, according to another example embodiment of the present invention.

FIG. 5 shows plots of voltage over time for an approach to power control, according to another example embodiment of the present invention. The approach shown in FIG. 5 may be implemented using, for example, the circuits in FIG. 3 and in FIG. 4, and is described in connection with these figures by way of example. The respective plots represent voltages as follows. Plot 510 is the primary power supply voltage $V_{CC}$ and plot 520 is the backup supply voltage $V_{BAT}$ (shown as a battery voltage by way of example). Plot 530 is a high voltage $V_{high}$ as described above, used to control the operation of power switches (e.g., using a levelshifter circuit), and plot 540 is the gate-source voltage $V_{GS}$ of a transistor operated to control the coupling of a power source.

As shown in the plots, for a ramp down range $V_{dd}$=$V_{CC}$=3.3V . . . 2.5V the value of $V_{GS}$=C−$V_{BAT}$ is constant with −0.268V until the switching point where $V_{dd}$ switches from $V_{CC}$ to $V_{BAT}$ (e.g., compare $V_{GS}$ at marker point A until $V_{GS}$ steps from −0.268V to −4V in FIG. 5). Therefore, the PMOS transistor of the backup power switch 334 is "off" because $V_{GS}$=−0.268V>$V_{thp}$.

This demonstrated behavior is effected by generated nwell voltage $V_{high}$, also shown in FIG. 5, which holds (via the PMOS series construction) the value with $V_{high}$=$V_{BAT}$−0.268V=4V−0.268V=3.732V slightly below the $V_{BAT}$=4V over the range $V_{dd}$=$V_{CC}$=3.3V to 2.5V. This $V_{high}$=3.732V is the power supply for the levelshifter circuit 314 so that C=3.732V and $C_n$=0V. This higher controlling voltage C from the levelshifter holds the PMOS transistor 336 of the backup power switch 334 in the "off" position.

Figure 6:
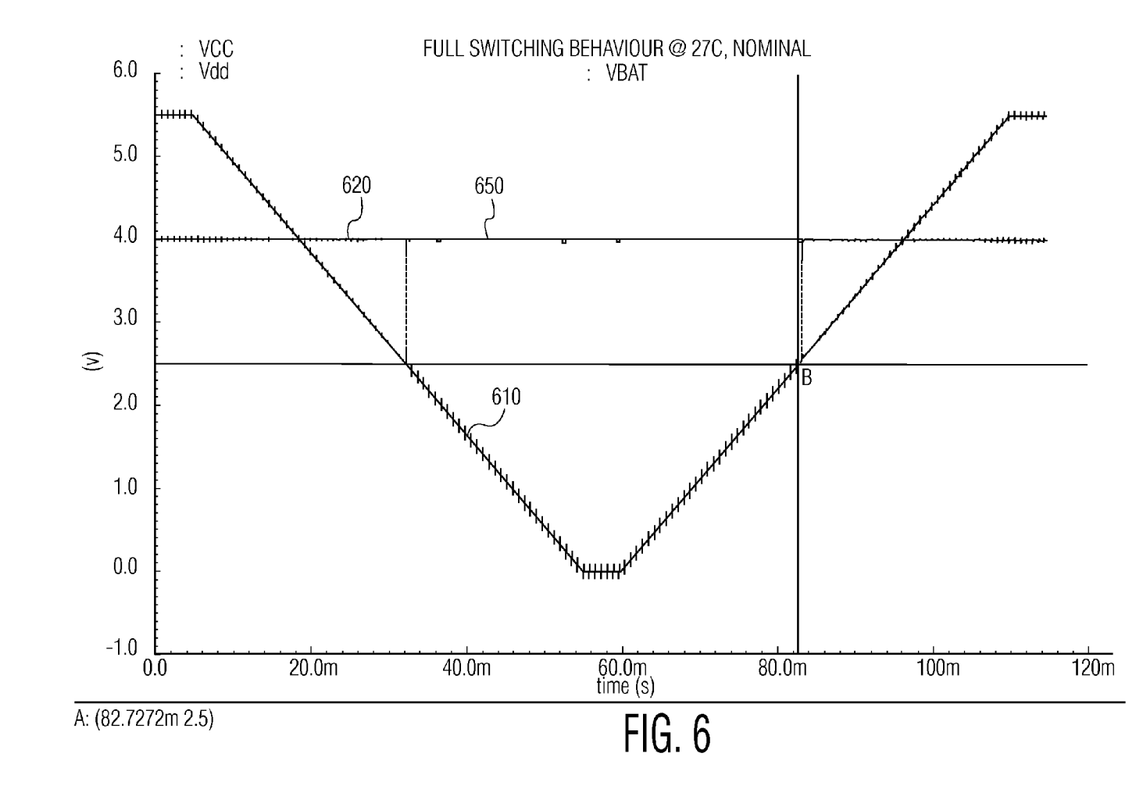
FIG. 6 shows plots for power switching as implemented in connection with other example embodiments of the present invention.

FIG. 6 shows plots for power switching as implemented in connection with other example embodiments of the present invention. As with the plot in FIG. 5, the plot in FIG. 6 may be implemented in connection with the circuits shown in FIG. 3 and in FIG. 4 and is described accordingly by way of example. The respective plots represent voltages as follows. Plot 610 is the primary power supply voltage $V_{CC}$ and plot 620 is the backup supply voltage $V_{BAT}$ (shown as a battery voltage by way of example). Plot 650 is the output voltage $V_{dd}$ as supplied by the power supply selectively coupled via power supply switches as controlled, for example, in FIG. 5 and as described above.

As is consistent with the plot in FIG. 6, in connection with various embodiments, switching is executed from backup power to primary power in a similar manner. Marker B in FIG. 6 characterizes a backward switching point, which is about the threshold voltage $V_{BMT}$=2.5V plus a small offset.

Various embodiments of the present invention are implemented using different types of circuit including, but not limited to, integrated circuits, CMOS devices, battery switchover circuits, and other similar types of electrical circuits.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such modifications and changes do not depart from the true scope of the present invention that is set forth in the following claims.

What is claimed is:

1. An arrangement for selectively coupling one of a primary power supply and a backup power supply to an output for operating a circuit, the arrangement comprising:
   a primary switch to couple the primary power supply to the output;
   a backup switch to couple the backup power supply to the output; and
   a controller circuit to control the operation of the switches for selectively coupling the primary and backup supplies to the output as a function of a voltage level of the primary and backup power supplies and a predetermined backup-mode threshold voltage, the controller circuit configured and arranged to compare a level of the primary power supply to the predetermined backup-mode threshold voltage and to the backup power supply and including
      a levelshifter circuit to supply a voltage input to the primary and backup switches for controlling the switches in on and off states in response to a high voltage input, and
      a high voltage supply circuit to selectively supply the high voltage input using the higher of the primary and backup power supply voltages.

2. The arrangement of claim 1, wherein the high voltage supply circuit facilitates the control of the primary and backup switches to mitigate parasitic shorting between the power supplies.

3. An arrangement for selectively coupling one of a primary power supply and a backup power supply to an output for operating a circuit, the arrangement comprising:
   a primary switch to couple the primary power supply to the output;
   a backup switch to couple the backup power supply to the output; and
   a controller circuit to control the operation of the switches for selectively coupling the primary and backup supplies to the output as a function of a voltage level of the primary backup power supplies and a predetermined threshold voltage, the controller circuit including
      a levelshifter circuit to supply a voltage input to the primary and backup switches for controlling the switches in on and off states in response to a high voltage input, and
      a high voltage supply circuit to selectively supply the high voltage input using the higher of the primary and backup power supply voltages, and including
   two PMOS transistors between the primary power supply and the backup power supply,
   a first of the two PMOS transistors has its source electrode coupled to the primary power supply and its gate coupled to the backup power supply,
   a second of the two PMOS transistors has its source electrode coupled to the backup power supply and its gate coupled to a voltage input provided by the levelshifter, and
   the drain electrodes of the PMOS transistors are coupled to supply said high voltage input.

4. The arrangement of claim 1, wherein the levelshifter circuit supplies a gate voltage to transistors for each of the primary and backup switches in response to the high voltage input.

5. The arrangement of claim 1, wherein the levelshifter circuit supplies, for each of the primary and backup switches, a first gate voltage to a gate of an NMOS transistor and a second gate voltage to a gate of a PMOS transistor.

6. The arrangement of claim 1, wherein the primary and backup switches each have an NMOS transistor and a PMOS transistor connected in parallel between the power source and the output.

7. The arrangement of claim 1, wherein
   the primary and backup switches each have an NMOS transistor and a PMOS transistor connected in parallel between the power source and the output, and
   the levelshifter circuit supplies the voltage input by supplying a first gate voltage to the NMOS transistors and a second gate voltage to the PMOS transistors.

8. The arrangement of claim 1, wherein
   the primary and backup switches each have an NMOS transistor and a PMOS transistor connected in parallel between the power source and the output, and
   the levelshifter circuit supplies the voltage input by supplying a first gate voltage input to the NMOS transistors and a second gate voltage input to the PMOS transistors by
      using the first gate voltage to control the coupling of the high voltage input as the second gate voltage input, and using the second gate voltage to control the coupling of the high voltage input as the first gate voltage input.

9. The arrangement of claim 1, wherein the high voltage supply circuit supplies a high voltage that is a voltage at a substrate of a PMOS transistor for the primary and backup switches.

10. The arrangement of claim 1, wherein, during a transition between power supplies in which one of the power supplies is being switched off and the other of the power supplies is being switched on, the high voltage supply circuit selectively supplies a high voltage input, using the higher of the primary and backup power supply voltages, by using the power supply being switched off until the voltage level of the power supply being switched off falls below the voltage level of the power supply being switched on.

11. The arrangement of claim 1, wherein, during a transition between power supplies in which one of the power supplies is being switched off and the other of the power supplies is being switched on, the controller circuit controls the gate-source voltage of a transistor in the switch being switched on at a level that is greater than a threshold level at which the transistor switches into a conducting state.

12. The arrangement of claim 1, wherein the controller circuit includes a circuit to selectively supply the primary and backup power supplies to the levelshifter circuit as a function of a comparison between the voltage levels of the primary and backup power supplies, and of a comparison between the voltage level of the primary power supply and the predetermined threshold voltage.

13. A switch controller arrangement for controlling power supply switches for selectively connecting primary and backup power supplies to an output node, the arrangement comprising:
a levelshifter circuit to supply a control voltage to each of the power supply switches for independently controlling the switches in on and off states in response to a high voltage input at a high voltage input node and in response to comparisons of a level of the primary power supply to a predetermined backup-mode threshold voltage and to the backup power supply; and
a high voltage supply circuit connected to the high voltage input node to selectively couple a high voltage to the levelshifter circuit for use in supplying said control voltage, by
coupling said high voltage using the backup power supply voltage under operating conditions in which the primary power supply voltage is lower than the backup power supply voltage, and
coupling said high voltage using the primary power supply voltage under conditions in which the primary power supply voltage is higher than the backup power supply voltage.

14. A switch controller arrangement for controlling power supply switches for selectively connecting primary and backup power supplies to an output node, the arrangement comprising:
a levelshifter circuit to supply a control voltage to each of the power supply switches for independently controlling the switches in on and off states in response to a high voltage input at a high voltage input node; and
a high voltage supply circuit connected to the high voltage input node to selectively couple a high voltage to the levelshifter circuit for use in supplying said control voltage, by
coupling said high voltage using the backup power supply voltage under operating conditions in which the primary power supply voltage is lower than the backup power supply voltage, and
coupling said high voltage using the primary power supply voltage under conditions in which the primary power supply voltage is higher than the backup power supply voltage wherein the high voltage supply circuit includes
a first PMOS transistor having source, drain and gate electrodes, the source electrode coupled to the primary power supply, the drain electrode coupled to the high voltage input node, and the gate electrode coupled to the backup power supply, and
a second PMOS transistor having source, drain and gate electrodes, the source electrode coupled to the backup power supply, the drain electrode coupled to the high voltage input node, and the gate electrode coupled to a voltage input provided by the levelshifter.

15. The arrangement of claim 13, wherein, for switching from a first one of the power supplies to a second one of the power supplies, the controller circuit controls the gate-source voltage of a transistor in a power supply switch for the second one of the power supplies by
coupling a voltage to the gate of the transistor using the voltage level of the first power supply until the voltage level of the first power supply falls below the voltage level of the second power supply, and
in response to the voltage level of the first power supply falling below the voltage level of the second power supply, coupling a voltage to the gate of the transistor using the voltage level of the second power supply.

16. A method for selectively coupling one of a primary power supply and a backup power supply to an output for operating a circuit, the method comprising:
comparing a level of the primary power supply to a predetermined backup-mode threshold voltage and to the backup power supply, and in response,
selectively coupling the primary and backup supplies to the output as a function of a voltage level of the primary and backup power supplies and a predetermined backup-mode threshold voltage, by
supplying a voltage input to the primary and backup switches for controlling the switches in on and off states, and
selectively supplying a high voltage input, using the higher of the primary and backup power supply voltages, to facilitate the control of the primary and backup switches and mitigate parasitic shorting between the power supplies.

* * * * *